Nov. 6, 1951      R. P. IRELAND      2,574,104
POSITION AND MOVEMENT REPRODUCING APPARATUS
Filed July 1, 1946      3 Sheets-Sheet 1
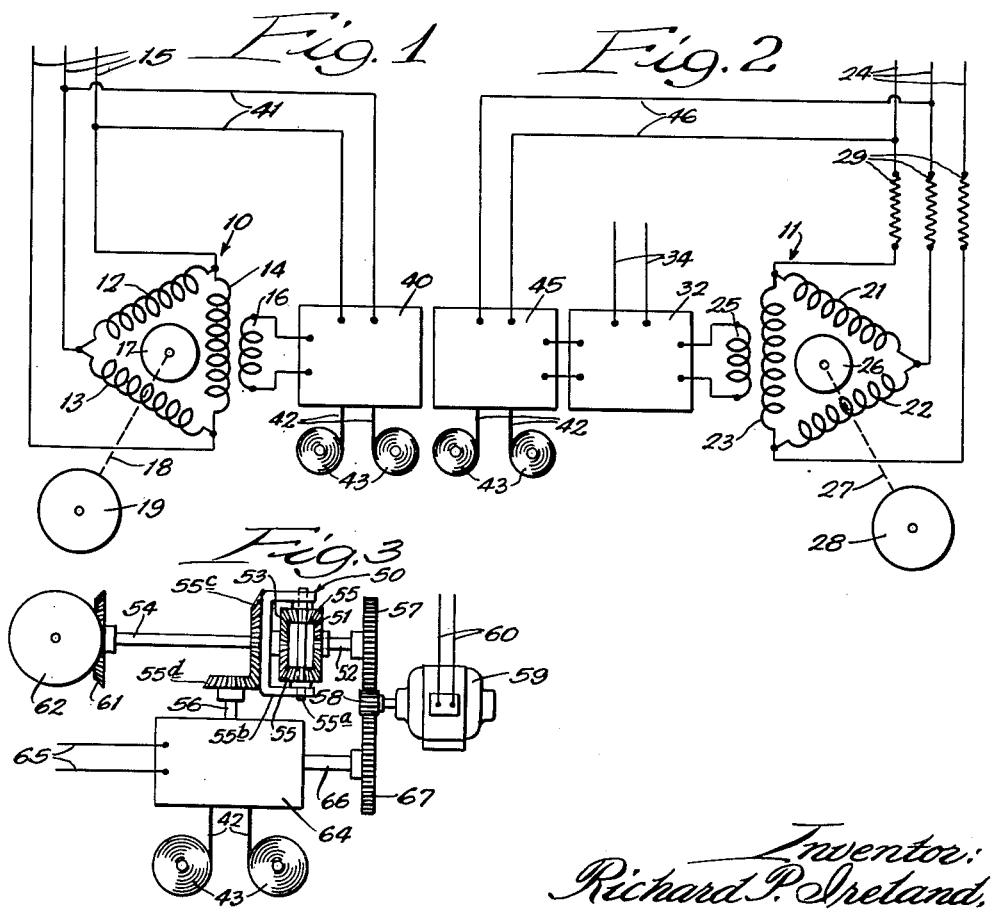
Inventor:
Richard P. Ireland,
By Dawson, Booth, Spangenberg,
Attorneys.

Nov. 6, 1951  R. P. IRELAND  2,574,104
POSITION AND MOVEMENT REPRODUCING APPARATUS
Filed July 1, 1946  3 Sheets-Sheet 2

Inventor:
Richard P. Ireland,
By Dawson, Booth and Hungerberg
Attorneys.

Nov. 6, 1951  R. P. IRELAND  2,574,104
POSITION AND MOVEMENT REPRODUCING APPARATUS
Filed July 1, 1946  3 Sheets-Sheet 3

Inventor:
Richard P. Ireland,
By Dawson, Booth and Spangenberg,
Attorneys.

Patented Nov. 6, 1951

2,574,104

UNITED STATES PATENT OFFICE 2,574,104

POSITION AND MOVEMENT REPRODUCING APPARATUS

Richard P. Ireland, Chicago, Ill., assignor, by mesne assignments, to Ampro Corporation, Chicago, Ill., a corporation of Illinois Application July 1, 1946, Serial No. 680,597

9 Claims. (Cl. 318—162)

1

The present invention relates to systems for reproducing programs of movements between accurately defined positions, especially to systems whereby a record may be made on a body of recording material of signals corresponding both to positions and to rates and degrees of movements between such positions, and whereby subsequently the signals may be reproduced from the record body and used to control operation of a motor repeater device in such manner as to produce the intended position and motion program.

The primary object of the invention is the provision of such a system, of novel arrangement, capable of highly satisfactory production or reproduction of a predetermined motion program accurately controlled as to positions, and rates and degrees of movements between such positions, and of very simple but highly effective arrangement.

Other objects and advantages will become apparent to those skilled in the art upon reference to the accompanying specification, claims, and drawings in which Fig. 1 is a diagrammatic illustration of a transmitter and recorder unit of a preferred type forming an element of the system of the invention.

Fig. 2 is a schematic diagram of a repeater station comprising a device for reproducing a signal from a record, as that produced by the recorder and transmitter of Fig. 1, and a receiver motor for operation by a signal so reproduced.

Fig. 3 is a schematic illustration of a modified form of transmitter;

Figure 4:
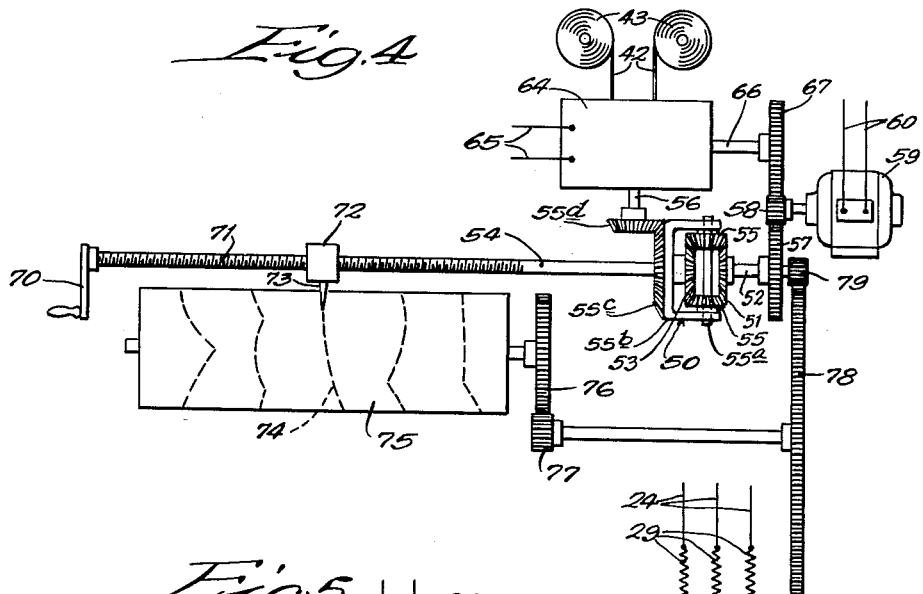
Fig. 4 is a schematic illustration of a further modified form of transmitter.

Referring now to Figs. 1 and 2 together, a transmitter is generally designated at 10 and a receiver at 11. The transmitter 10 includes a primary winding consisting of windings 12, 13 and 14 connected in delta and to a source 15 of three phase alternating voltage. The primary windings provide a three phase rotating field. The transmitter also includes a single phase secondary winding 16 inductively coupled to the primary winding. Either the primary winding or the second winding may be carried by a rotor 17 so that relative motion between the primary and secondary windings is provided. The rotor

2

17 may be rotated through a suitable mechanical connection 18 by a device 19 the movement and position of which is to be reproduced.

The three phase primary winding induces or generates a single phase alternating voltage in the secondary winding 16 and because of the rotating field produced by the primary winding the phase displacement of the single phase alternating voltage in the secondary winding 16 depends directly upon the angular position of the secondary winding 16 with respect to the primary winding. In other words, for every position there is a corresponding phase displacement.

Upon movement of the secondary winding 16 with respect to the primary winding because of shifting from one phase displacement to another, the frequency of the alternating voltage generated in the secondary winding 16 is caused to change and the change in frequency is directly proportional to the rate of movement of the secondary winding 16 with respect to the primary winding. Accordingly, therefore, an intermittent signal in the nature of an alternating voltage is generated in the secondary winding 16 and the phase of the alternating voltage is directly dependent upon the relative positions of the primary winding and the secondary winding and the frequency of the alternating voltage is directly dependent upon the rate of relative movement of the primary and secondary windings.

Referring to Fig. 2, a receiver 11 of Fig. 2 includes a three phase primary winding having windings 21, 22 and 23 connected in delta and to a three phase alternating voltage source 24. The receiver 11 also includes a single phase secondary winding 25 inductively coupled to the primary winding. Either the primary winding or the secondary winding 25 may be carried by a rotor 26 so that relative movement between the primary winding and the secondary winding is provided. The rotor 26 may be mechanically connected as at 27 to a device 28 to be moved and positioned.

The primary winding provides a rotating field and when an alternating voltage is applied to the secondary winding 25, the primary and secondary windings are relatively moved to a position depending upon the character of the alternating voltage applied to the secondary 25. For every phase displacement in the applied alternating voltage the rotor 26 assumes a predetermined position and upon a change in frequency of the applied alternating voltage the rotor 26 is caused to move and the speed of movement is proportional to the change in frequency of the applied alternating voltage. Accordingly when an alternating voltage is applied to the secondary winding 25, the rotor 26 assumes positions corresponding to the phase displacement of the alternating voltage and is moved upon a change in frequency of the applied voltage and the rate of movement is dependent upon the frequency value.

Resistances 29 are preferably included in the connections between the primary winding and the three phase alternating voltage source. The resistances 29 are high in value with respect to the impedance of the primary winding and are utilized to prevent distortion of the primary rotary field by reactions from the secondary winding. A power amplifier 32 may have its output connected across the receiver secondary 25. Power for the amplifier 32 is supplied from a suitable source, not shown, by wires 34.

A recorder 40 is associated with the transmitter 10 and it may take the form of a conventional recorder for producing recordings on a record 42 carried by spools 43. The recorder 40 includes a motor for driving at a constant speed the record 42 and the motor is preferably energized though the wires 41 from the three phase alternating voltage source so that the operation of the recorder 40 is synchronized with the operation of the transmitter 10. The alternating voltage generated in the secondary 16 of the transmitter 10 is applied to the recording means in the recorder 40 for producing intermittent recordings on the record 42, with the displacement of the intermittent recordings relative to the phase of the primary voltage, which serves as a reference frequency, and also relative to the motor-driving voltage applied through wires 41 and serving to drive the record body at a predetermined rate relative to frequency of the primary or reference frequency in accordance with the phase of the generated alternating voltage and the frequency of the intermittent recordings corresponding to the frequency of the generated alternating voltage. The record 42 may take the form of a film and the intermittent recordings thereon the form of spots. Other forms of records 42 may be utilized such as the well known wire record having intermittent recordings of varying magnetism therein. Thus, intermittent recordings are recorded on the record 42, the displacement and frequency of which depend upon the position and rate of movement respectively of the movable device 19.

Associated with the receiver 11 and power amplifier 32 of Fig. 2 is a record reproducer 45 connected to and synchronized with the three phase alternating voltage source 24 by wires 46. The record reproducer 45 may be of conventional design for generating a voltage corresponding to the intermittent recordings on the record 42 carried by the spools 43. The record 42 is driven at a constant speed and in synchronism with the three phase alternating voltage source 24 by a suitable motor located in the record reproducer. The alternating voltage thus generated has a phase and frequency directly dependent upon the displacement and frequency of the intermittent recordings on the record 42 relative to the primary and motor-driving voltages at the time of making the recording, and the alternating voltage thus generated is timed by the relation between phase of current in the primary winding 21, 22, 23 to the positional relation of the record 42 to the reproducer pickup device, accomplished through the phase relation of the recorded signals to the motor-driving voltage applied through wires 34 with the three phase alternating voltage source 24. This generated alternating voltage is then amplified by the power amplifier 32 and applied to the secondary winding 25 of the receiver 11 whereby the device 28 to be moved and positioned is so moved and positioned in accordance with the frequency and displacement of the intermittent recordings on the record 42. In this manner movement and position of the device 19 may be recorded on the record 42 and then the record 42 may be utilized at a later time for moving and positioning the device 28 to be moved.

Fig. 3 represents a modified form of transmitter for producing intermittent signals having a phase displacement depending upon the position of a movable device and having a frequency depending upon the rate of movement of the movable device. The signals thus produced may be transmitted directly to a receiver as illustrated in Fig. 1 or the signals may be utilized for producing intermittent recordings on a record 42 carried by spools 43. In this arrangement a differential transmission generally designated at 50 may be utilized. The differential transmission 50 may include a bevel gear 51 operated by an input shaft 52 and a bevel gear 53 operated by an input shaft 54. A plurality of gears 55 carried by a shaft 55ª mesh with the gears 51 and 53 and the shaft 55ª is carried by a yoke 55ᵇ rotatably mounted on the shaft 54. The yoke carries a bevel gear 55ᶜ meshing with a bevel gear 55ᵈ carried by an output shaft 56. The input shaft 52 may be driven at a constant speed by a gear 57 and pinion 58 driven by a constant speed motor 59 supplied with power by means of wires 60 leading from some source of power not shown. Preferably the motor 59 is a synchronous motor operated from an alternating voltage source. The other input shaft 54 may be operated by a gear 61 which in turn is operated by a movable device 62.

The output shaft 56 of the differential transmission 50 may control a recorder 64. The recorder may take the form of a light modulator supplied with electrical energy by means of wires 65 leading from some source of power not shown, and the record 42 may be driven at a constant speed through the recorder 64 by a shaft 66 connected by a gear 67 and pinion 58 to the constant speed motor 59. The light modulator may include a shutter operated by the shaft 56 for interrupting a light beam or it may include a switch operated by the shaft 56 for intermittently controlling the light source. In this way the recorder 64 is synchronized with the differential transmission 50 inasmuch as both are driven from the same constant speed motor 59.

The output shaft 56 controls the light modulator to produce intermittent recordings on the film record 42. When the movable device 62 is stationary, the frequency of the intermittent recordings will remain constant but the displacement of the intermittent recordings will be directly dependent upon the position of the movable device 62. When the movable device 62 is moved, the frequency of the intermittent recordings is varied and the frequency will be directly dependent upon the rate of movement of the movable device 62. In this way the position and movement of the movable device 62 is recorded on the record 42 in intermittent recordings. The record 42 may then be run through the record reproducer 45 of Fig. 2 so that the original movement of the movable device 62 may be accurately reproduced by the device to be moved 28 of Fig. 2. Alternatively the output shaft 56 operating in conjunction with the constant speed shaft 66 of Fig. 3 may be utilized for generating an alternating voltage which may be applied directly to the voltage amplifier 32 of Fig. 1 for simultaneous movement and position reproduction.

In the arrangement of Fig. 4 the same differential transmission 50 and recorder 64 are utilized and, therefore, like reference characters are used for designating like parts. However, in Fig. 4 it is the purpose to provide intermittent recordings on the record 42 in accordance with predetermined calculations rather than in accordance with movements of a movable device. In this connection the input shaft 54 is provided with a suitable crank 70 or other means for rotating the same. The shaft 54 may be provided with screw threads 71 for reciprocating a table 72 provided with a follower 73. The follower 73 is adapted to cooperate with lines 74 provided on a movable chart 75. The chart 75 may be mounted on a drum and rotated at slow speed through gearing 76, 77, 78, 79, 57 and 58 by the motor 59. The lines 74 are placed on the chart 75 in accordance with predetermined calculations. As the chart 75 is slowly rotated the crank 70 is operated to cause the follower 73 to follow the lines 74, and the rotative motion of the shaft 54 in thus following the lines 74 controls the operation of the recorder 64 so that the intermittent recordings placed on the record 42 correspond in displacement and frequency to the lines 74 on the chart 75 and hence in accordance with the predetermined calculations.

The record 42 produced by the recorder 64 of Fig. 4 may then be run through the record reproducer 45 of Fig. 2 so that the device to be moved 28 of Fig. 2 may be accurately moved and positioned in accordance with the original calculations utilized in computing the chart 75 in Fig. 4.

Figure 5:
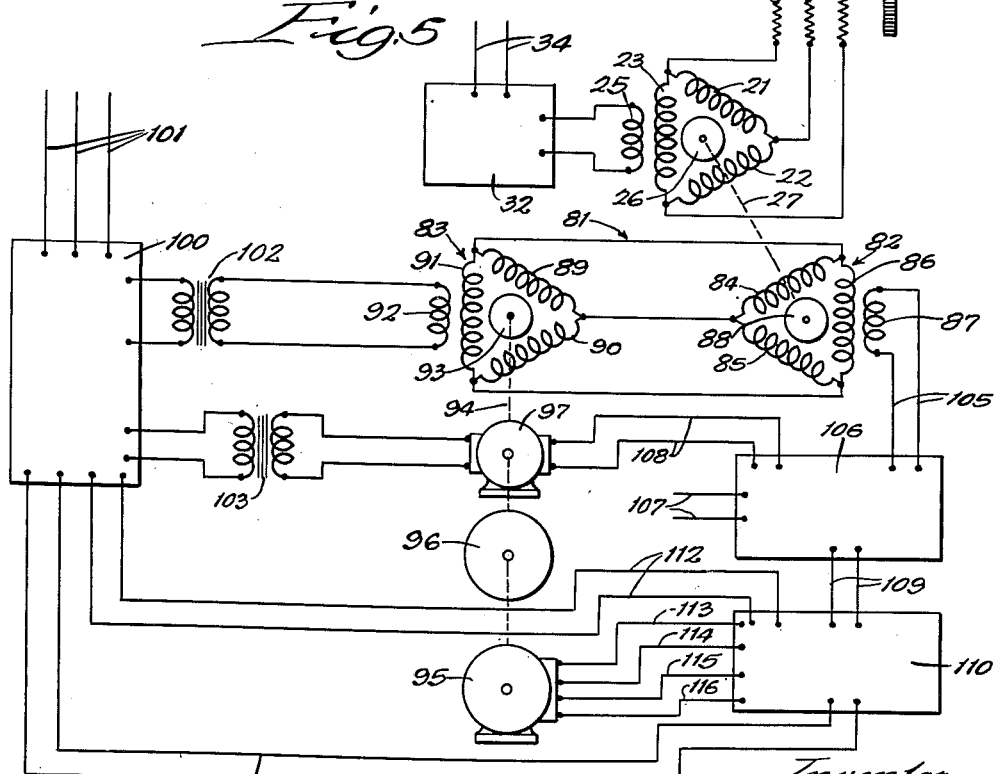
Fig. 5 is a schematic illustration of a servo mechanism.

If it is desired to have the receivers 11 control and operate heavy loads, a suitable servo mechanism may be controlled thereby. An improved servo mechanism for moving heavy loads under the control of the receiver 11 is schematically illustrated in Fig. 5. Here the receiver 11 corresponds to that of Fig. 2, and like reference characters for like parts have been utilized. The servo mechanism may include a self-balancing network generally designated at 81, which may take the form of a conventional Selsyn system. The self-balancing network 81 may be provided with control means 82 and follow up or rebalancing means 83. The control means may include a Selsyn motor having 120 degree distributed windings 84, 85 and 86, similar to three phase windings, and a single winding 87. One of the windings may be carried by a rotor 88 mechanically connected as at 27 to the rotor 26 of the receiver 11. Movements in the receiver, therefore, cause corresponding movements in the control means 82.

The follow up or rebalancing means 83 may include 120 degree distributed windings 89, 90 and 91, and a single winding 92, one of the windings being carried by a rotor 93, which in turn may be mechanically connected as at 94 to a reversible electric motor 95. The reversible motor in addition to operating the rotor 90 of the follow up or rebalancing means 83 also operates the heavy load 96 which is to be positioned and moved, and in addition it may operate a quadrature drag cup or induction generator 97 for producing an alternating voltage which may be of one phase or of opposite phase, depending upon the direction of rotation, and which may have an amplitude depending upon the speed of rotation.

A phaser 100 may be connected to a source of three phase alternating voltage by wires 101 and a single phase alternating voltage may be derived therefrom and applied through an isolating transformer 102 to the single phase winding 92 of the Selsyn system forming the self-balancing electrical network. Also, an alternating voltage may be taken from the phaser 100 and applied through an isolating transformer 103 to the alternating voltage induction generator 97.

The winding 87 of the Selsyn system 81 may be connected by wires 105 to a voltage amplifier 106. When the Selsyn system 81 is in balance no signal is applied to the voltage amplifier 106 by the wires 105. If, however, the control means 82 of the Selsyn system is moved in one direction an alternating voltage signal of one phase is applied to the voltage amplifier 106 and if the control means is moved in the opposite direction an alternating voltage signal of opposite phase is applied to the voltage amplifier 106. The voltage amplifier 106 is provided with a suitable source of electrical power by wires 107. The output of the alternating voltage induction generator 97 is applied to the input of the voltage amplifier 106 by wires 108. The voltage amplifier 106 mixes the signals from the self-balancing electrical network 81 and the voltage generator 97 into a resultant alternating voltage which is amplified by the voltage amplifier 106. The amplified resultant alternating voltage is applied to the input of a power amplifier 110 by wires 109. A single phase alternating current is suplied to the power amplifier 110 by wires 111 leading from the phaser 100. An alternating voltage of displaced phase is provided by the phaser 100 through wires 112 to the input of the power amplifier 110.

The reversible electric motor 95 may be a direct current shunt motor having one of the windings therein supplied with unidirectional current of one polarity or opposite polarity through wires 113 and 114 from the power amplifier 110 and having the other winding supplied with a direct current of single polarity through wires 115 and 116 from the power amplifier 110. Thus the power amplifier 110 controls the direction and speed of operation of the reversible motor 95 under the control of the power amplifier 106 which, in turn, is controlled by the self-balancing electrical network 81 and the generator 97. The self-balancing network 81 determines the direction and speed of rotation of the reversible motor 95 for rebalancing the electrical network and the generator 97 operates to retard the rotation of the electrical motor 95 as balance in the electrical network 81 is approached, whereby overshooting and hunting around the balance point may be entirely eliminated.

Figure 6:
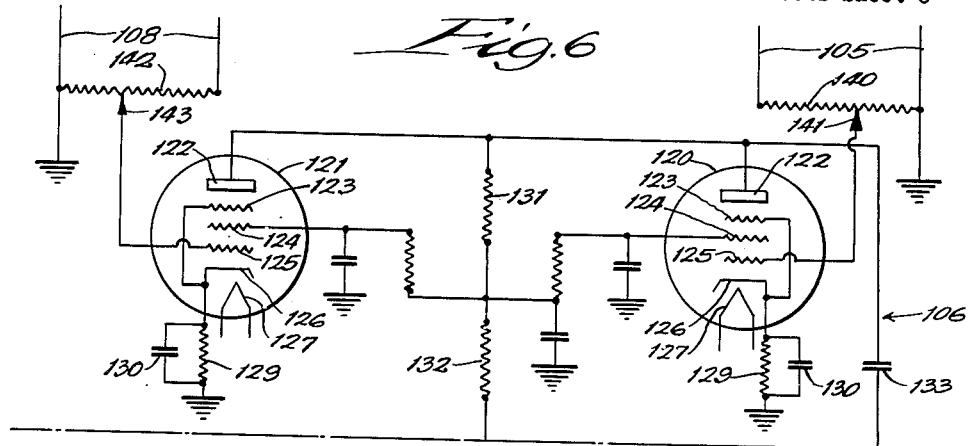
Fig. 6 is a partial wiring diagram of a portion of the voltage amplifier utilized in Fig. 5.

A portion of the voltage amplifier 106 is diagrammatically illustrated in Fig. 6. The voltage amplifier 106 includes a pair of vacuum tubes 120 and 121, each having a plate 122, a suppresser grid 123, a screen grid 124, a control grid 125, a cathode 126 and a heater 127. The screen grid and the suppresser grid are electrically connected in the associated tube circuit in the conventional manner.

The cathodes 126 of the tubes 120 and 121 are connected to ground through a parallel connected resistance 129 and condenser 130 providing a suitable grid bias. The plates 122 of the tubes 120 and 121 are connected together and through resistances 131 and 132 to a suitable source of direct current. The signals produced in the plate circuits of the two tubes are thus mixed and are capacity coupled by a condenser 133 to the subsequent amplifying stages in the voltage amplifier which preferably provides a push-pull ampifying action. Since the subsequent stages are conventional in the art, a further description thereof is not considered necessary.

The output from the voltage amplifier is provided with a transformer 135 having a center tapped primary 136 and a secondary 137 connected to the output wires 109 leading therefrom. A resistance 138 may be connected across the secondary 137.

The wires 105 leading from the Selsyn system 81 are connected across a resistance 140 one end of which is connected to ground. An adjustable tap 141 associated with the resistance 140 is connected to the control grid 125 of the tube 120. In like manner the wires 108 leading from the voltage generator 97 are connected across a resistance 142, one end of which is connected to ground. An adjustable tap 143 associated with the resistance 142 is connected to the control grid 125 of the tube 121. The alternating voltages from the Selsyn system 81 and from the generator 97 are thereby applied to the control grids of the tubes 120 and 121 respectively and the relative amounts of the alternating voltages thus applied may be regulated by adjustment of the taps 141 and 143. The output signals from the tubes 120 and 121 are algebraically added and mixed through the resistance 131 into a resultant alternating voltage which is amplified and applied to the wires 109 leading to the input of the power amplifier 110.

Figure 7:
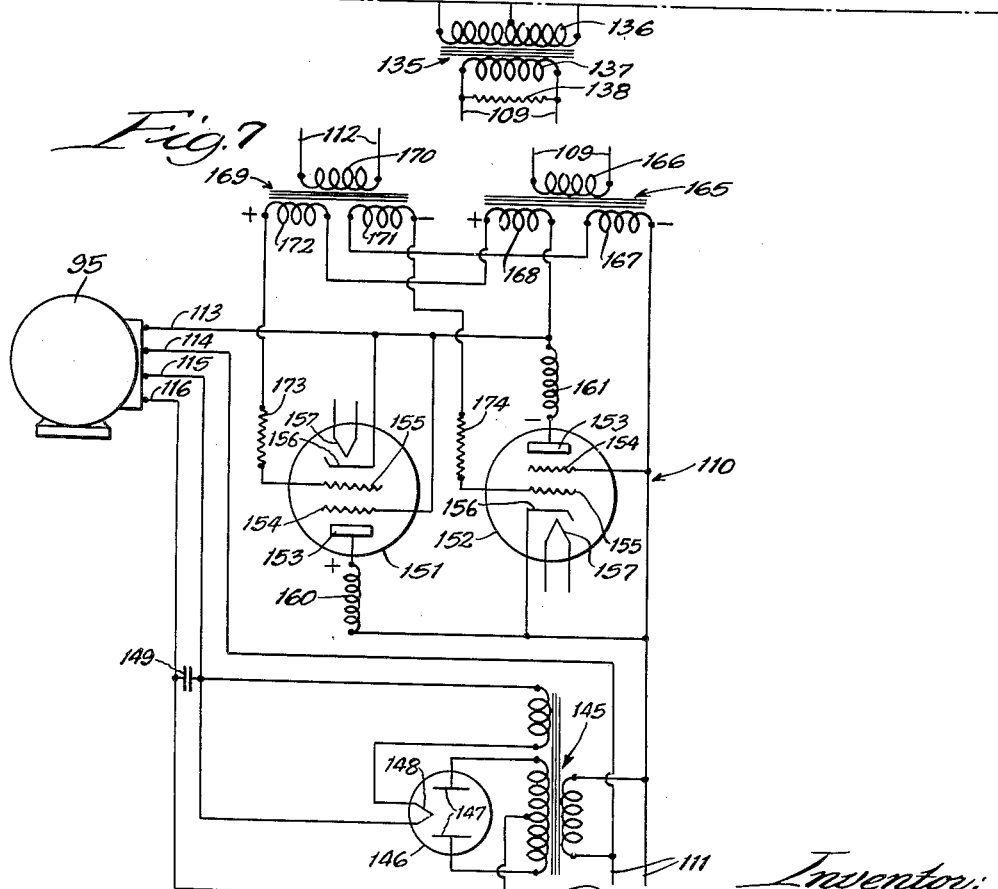
Fig. 7 is a schematic wiring diagram of the power amplifier utilized in Fig. 5.

The power amplifier 110 is diagrammatically illustrated in Fig. 7 and includes a transformer 145, a rectifier tube 146 having plates 147 and a cathode 148 for producing a direct current voltage across a condenser 149 in conventional manner. Direct current is then supplied from the condenser 149 through wires 115 and 116 to one of the windings of the direct current shunt motor 95. This direct current is always in the same direction.

The power amplifier 110 also includes a pair of gas discharge tubes 151 and 152 each having a plate 153, a suppresser grid 154, a control grid 155, a cathode 156 and a heater 157, the suppresser grids 154 being connected to the cathode 156. The gas discharge tubes 151 and 152 are reversely connected with the plate 153 of tube 151 connected through an inductance 162 to the cathode 156 of the other tube 152 and to one of the wires 111. The plate 153 of the tube 152 is connected through an inductance 161 to the cathode 156 of the other tube 151 and to the wire 113 leading to one of the windings in the direct current shunt motor 95. The other wire 111 is connected to the wire 114 leading to the winding in the shunt motor 95. The wires 109 extending from the voltage amplifier 106 are connected to a primary 166 of a transformer 165 having a pair of secondaries 167 and 168 respectively, these secondaries being so wound that the left hand ends thereof are positive at the same time. The wires 112 leading from the phaser 100 are connected with a primary 170 of a transformer 169 having a pair of secondaries 171 and 172 which are also wound so that the left ends of the secondaries are positive at the same time. The left end of the secondary 172 is connected through a resistance 173 to the control grid 155 of the tube 151 and the right end of the secondary 171 is connected through a resistance 174 to the control grid 155 of the tube 152. The right end of the secondary 172 is connected to the left end of the secondary 168 and the left end of the secondary 171 is connected to the left end of the secondary 167. The right end of the secondary 168 is connected to the cathode 156 of the tube 151 and the right end of the secondary 167 is connected to the cathode 156 of the tube 152. The inductances 160 and 161 are utilized for interference reduction purposes.

When no signal is applied to the transformer 165, as when the Selsyn system is in balance and the motor stationary, no alternating voltage is developed in the transformer secondaries 167 and 168. When a signal is applied to the transformer 165, the voltage developed in the secondaries 167 and 168 is either in phase with or 180 degrees out of phase with the supply voltage applied to the gas discharge tubes 151 and 152, depending upon the direction of unbalance of the Selsyn system.

The voltage supplied to the transformer 169 from the phaser 100 produces an alternating voltage in the secondary windings 171 and 172 and this voltage lags the supply voltage to the gas discharge tubes 151 and 152 by almost 180 degrees.

Assume now that no signal is applied to the transformer 165 from the voltage amplifier 106. During the first half cycle the plate voltage of the gas discharge tube 151 is positive and the plate voltage of the gas discharge tube 152 is negative. During the second half cycle the reverse condition is true. At the end of the first half cycle the control grid of the gas discharge tube 151 is driven positive by the voltage induced in the secondary 172 whereby the gas discharge tube 151 fires at the end of the first half cycle. During the second half cycle the plate of the gas discharge tube 152 is positive and at the end of the second half cycle the transformer secondary 171 drives the control grid positive whereby the gas discharge tube 152 fires at the end of the second half cycle. In this way a small pulse of current is supplied through the wire 113 to the winding in the shunt motor 95 during the first half cycle and a small pulse is supplied to the winding through the wire 114 during the second half cycle. These small pulses being of equal intensity in opposite directions tend to maintain the motor 95 in a nascent condition so that it may be readily rotated in one direction or the other upon the occurrence of signals in the transformer 165.

Assume now that the left ends of the transformer secondaries 167 and 168 of the transformer 165 are positive during the first half cycle as a result of unbalance in one direction of the Selsyn system. This causes a forward shifting of the phase of the voltage applied to the control grid of the gaseous discharge tube 151 to advance the firing point of that tube during the first half cycle so that the gas discharge tube 151 supplies more current to the shunt motor 95 through the wire 113 during the first half cycle. During the second half cycle when the left end of the transformer secondary 165 is negative, the phase of the signal applied to control grid of the gas discharge tube 152 is retarded whereby the gas discharge tube 152 conducts less current during the second half cycle. Therefore, less current is supplied to the shunt motor 95 through the wire 114 during the second half cycle.

The current supplied to the shunt motor under these conditions of operation, therefore, has a pronounced unidirectional component in one direction to drive the shunt motor in one direction for the purpose of rebalancing the Selsyn system.

When the Selsyn system is unbalanced in the other direction, the opposite mode of operation takes place, namely the gas discharge tube 152 conducts longer during the second half cycle and the gas discharge tube 151 conducts less during the first half cycle. As a result of the current supplied to the shunt motor 95 in one direction or the other depends directly upon the resultant of the extent of unbalance of the Selsyn system and the speed of operation of the reversible motor 95. Since the speed of operation of the motor 95 is dependent upon a signal which is the result of the unbalance of the electrical network 81 and the action of the generator 97, the motor 95 is accurately controlled to rebalance the electrical network 81 without overshooting and hunting of the system. At the same time it provides for rapid operation of the motor when the electrical network 81 is greatly unbalanced but as a balance point is approached during the rebalancing operation, the signal is materially weakened by the balancing action and by the generator 97 for slowing down the motor 95 and preventing coasting of the motor beyond the balance position and hunting of the motor therearound.

While for purposes of illustration several forms of this invention have been disclosed, other forms thereof may become apparent to those skilled in the art and, therefore, this invention is to be limited only by the scope of the appended claims and prior art.

I claim as my invention:

1. A receiver reproducer consisting of, a three phase primary winding for connection to a three phase alternating voltage source, a single phase secondary winding inductively coupled to the primary winding, one of said windings being freely movable relative to the other, a record controlled single phase voltage generating device arranged for operation by a voltage synchronized with a three phase alternating voltage applied to the primary winding for generating a single phase alternating voltage in response to intermittent recordings on the record with the frequency of the generated voltage corresponding to the frequency of the intermittent recordings and the phase of the generated voltage corresponding to the displacement of the intermittent recordings from such three-phase voltage, and means for applying across the secondary winding a single phase alternating voltage corresponding to the generated voltage of sufficient amplitude moving said freely rotatable winding upon a change of effective relative directions of axes of magnetic fields generated by the respective windings, for relatively positioning the windings in accordance with the phase of the applied alternating voltage relative to that of such an applied polyphase voltage.

2. A transmitter recorder including apparatus for advancing a record at a constant speed, recording means energizable by constant frequency alternating current for placing intermittent recordings on the record, a movable device for controlling the recording means to regulate the frequency of the intermittent recordings in accordance with the speed of the movable device and the displacement of the intermittent recordings from preselected phase relation to alternating current energizing said recording means in accordance with the position of the movable device, a receiver reproducer including, a three phase primary winding for connection to a three phase alternating voltage source, a single phase secondary winding inductively coupled to the primary winding, said windings being relatively movable, a record controlled voltage generating device for operation in synchronism with a three phase alternating voltage source to which the three phase primary winding is connected for generating a single phase alternating voltage in response to intermittent recordings on the recordings on the record with the frequency of the generated voltage corresponding to the frequency of the intermittent recordings and the phase of the generated voltage corresponding to the displacement of the intermittent recordings, and means for applying across the secondary winding a single phase alternating voltage corresponding to the generated voltage for relatively moving the windings upon a change in frequency of the applied alternating voltage and for relatively positioning the windings in accordance with the phase of the applied alternating voltage.

3. A receiver reproducer including, a three phase primary winding for connection to a three phase alternating voltage source, a single phase secondary winding inductively coupled to the primary winding, one of said windings being mounted on a freely movable rotor for relative movement of said windings, a record controlled voltage generating device arranged for operation in synchronism with such a three phase alternating voltage source for generating a single phase alternating voltage in response to intermittent recordings on the record with the frequency of the generated voltage corresponding to the frequency of the intermittent recordings and the phase of the generated voltage relative to such a three-phase voltage corresponding to a position to be produced, means for applying to the secondary winding a single phase alternating voltage corresponding to the generated voltage of sufficient amplitude to move said rotor to such a represented position by interaction of magnetic fields generated by the respective windings upon a change in phase of the applied alternating voltage and for relatively positioning the windings in accordance with the phase of the applied alternating voltage, 4. A transmitter recorder including apparatus for advancing a record at a constant speed, recording means for placing intermittent recordings on the record, means for supplying a constant reference frequency signal, a movable device for controlling the recording means to regulate the frequency of the intermittent recordings in accordance with the speed of the movable device, and the displacement of the intermittent recordings relative to a reference frequency supplied by said constant reference signal means in accordance with the position of the movable device, a receiver reproducer including apparatus for advancing the record at constant speed, a device to be moved, second means for supplying a constant reference frequency signal, means controlled by the record for moving the device to be moved at a speed corresponding to the frequency of the intermittent recordings and to a position corresponding to the displacement of the intermittent recordings relative to signals supplied by said second reference frequency means, and a servo mechanism controlled by the device to be moved.

5. In a motion degree and rate and position reproducing system that comprises a transmitter assembly for generating a program of signals representing a program of motion, a recorder for making a record of such signal program, a reproducer for generating from such a record a reproduction of such a signal program, and a repeater assembly for producing the motion program from the reproduced signal program; the improvement consisting in the transmitter assembly comprising a variable transformer including in relatively movable arrangement a polyphase primary winding for energization by an alternating current source and a single phase secondary winding connected to the recorder signal input and inductively coupled to the primary winding, means for driving the recorder in synchronized relation with a voltage energizing said primary winding, the repeater assembly comprising a phase-sensitive motor including in relatively movable arrangement a polyphase primary winding and a single phase secondary winding, said windings being relatively disposed for torque-producing interaction of magnetic fields that they respectively generate upon departure of the relative positions of the windings from a neutral positional relation, determined by phase relation of their respective magnetic fields, means for driving the reproducer in synchronism with a polyphase voltage applied to said repeater assembly primary winding for reproduction of signals from the record in the same phase relation to such voltage as the original signals bear to the polyphase primary voltage of the transmitter assembly during their recording, and means for applying to the secondary windings of the repeater assembly a single phase alternating voltage corresponding to the reproduced signals in phase relation to the polyphase voltage energizing the primary winding of the repeater and of sufficient amplitude to generate winding-driving magnetic fields.

6. A motion recording and reproducing system comprising; means for advancing a record at a rate having a constant proportional relation to a reference frequency; a transmitter assembly comprising a primary winding for energization by alternating voltage corresponding in phase and frequency to such a reference frequency, and a single phase secondary winding, said windings being inductively coupled, relatively rotatable and arranged for phase displacement of the secondary voltage relative to such reference frequency in proportion to displacement of the respective windings from a neutral relative positional relation and for frequency variations proportional to rate of variation of such displacement; means energized by said secondary winding for making on said record intermittent recordings corresponding in frequency to the frequency of such secondary voltage and in phase relation to such reference frequency corresponding to the positional relation of the windings to their neutral relative positions; second means for advancing a record body upon which such recordings have been made by the transmitter assembly, at a rate having a constant proportional relation to a second reference frequency; means for producing from recordings upon such record signals of frequency corresponding to that of such recordings and of phase relation to such second reference frequency corresponding to that of the transmitter secondary voltage to the first reference frequency during recording; and a repeater assembly comprising a primary winding for energization by alternating voltage corresponding in phase and frequency to such second reference frequency, a single phase secondary winding, said windings being inductively coupled, relatively rotatable freely and arranged for torque-producing interaction of magnetic fields that they respectively produce when displaced from neutral relative position that depends in relative phase of such fields; and means for applying to said secondary winding an intermittent voltage corresponding to signals produced from the record in frequency and in phase relation to such secondary reference frequency, and of amplitude sufficient to relatively move said windings toward their neutral position as determined by such phase relation when the windings are displaced from such neutral position.

7. A repeater assembly including means for advancing a record at a rate having a constant proportional relation to a reference frequency, a device to be moved, a motor including a secondary winding, a primary winding for energization by voltage having a frequency and phase corresponding to those of such a reference frequency, one of said windings being carried by a rotor mechanically connected to said device to be operated and for rotation relative to said other winding, and said windings being arrange for torque-producing interaction of magnetic fields that they respectively generate when in other than neutral relative positions of the effective axes of such fields, means for producing from the record signals corresponding to intermittent recordings of variable frequency, means for applying to said secondary winding an alternating voltage corresponding to the reproduced signals in phase relation to such reference frequency, and of sufficient amplitude to drive the rotor and the device to be positioned by torque produced by such interaction of magnetic fields upon phase disagreement between such secondary and reference voltages.

8. A motion and position recording and reproducing system according to claim 6, wherein the respective primary windings of said transmitter and repeater assembles comprise three-phase windings.

9. A repeater assembly according to claim 7 wherein said motor primary winding is a three-phase winding.

RICHARD P. IRELAND.

REFERENCES CITED

The following references are of record in the file of this patent:

UNITED STATES PATENTS

| Number | Name | Date |
|---|---|---|
| 1,794,509 | Beckmann | Mar. 3, 1931 |
| 2,115,086 | Riggs | Apr. 26, 1938 |
| 2,213,108 | Pollard | Aug. 27, 1940 |
| 2,286,571 | Pollard | June 16, 1942 |
| 2,356,186 | Somers | Aug. 22, 1944 |
| 2,406,856 | Satterlee | Sept. 3, 1946 |
| 2,414,430 | Nisbet | Jan. 14, 1947 |